Sept. 24, 1935.   C. L. HARVEY ET AL   2,015,596
METHOD OF MAKING NUT BLANKS
Filed June 22, 1933   2 Sheets-Sheet 1
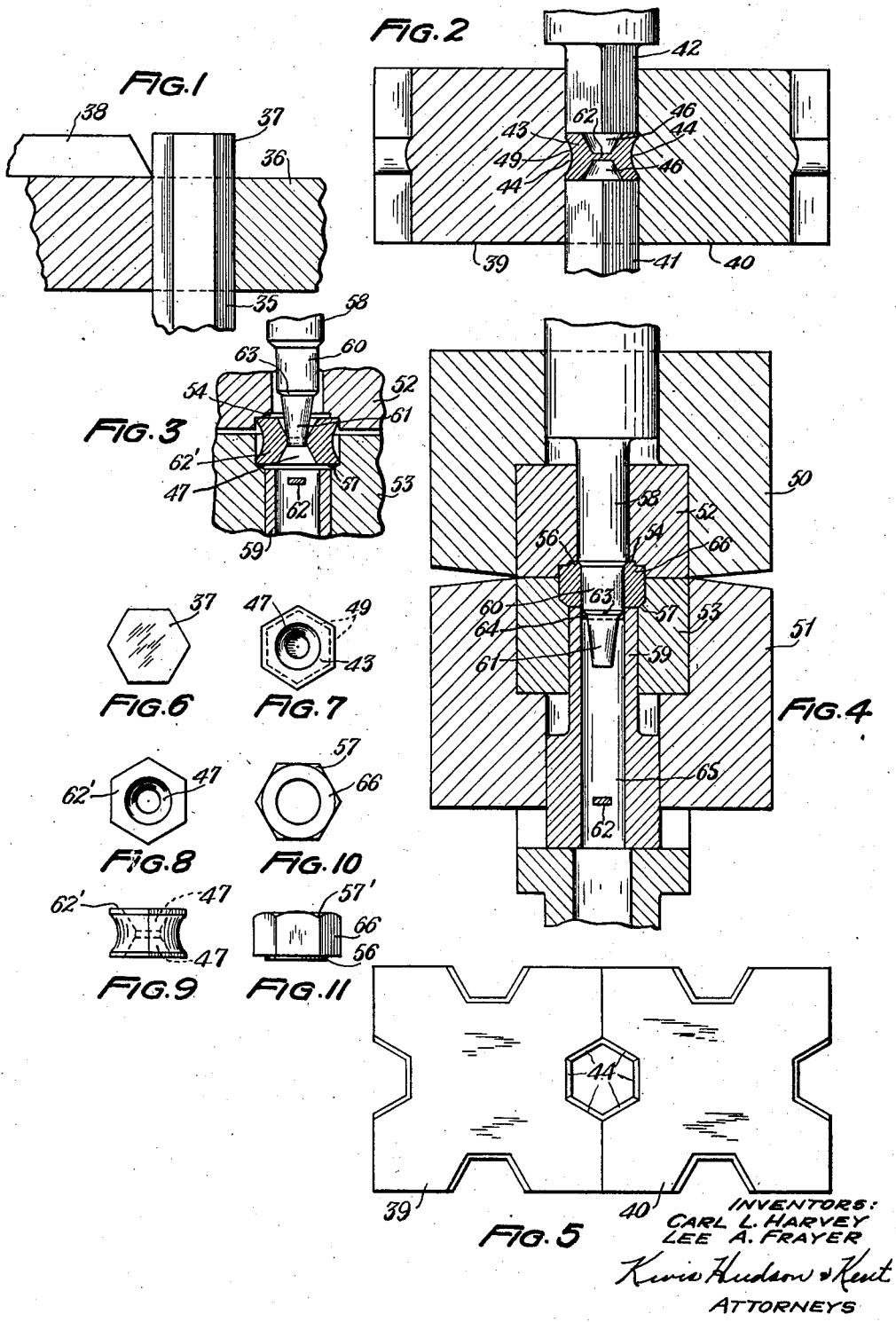
INVENTORS:
CARL L. HARVEY
LEE A. FRAYER
ATTORNEYS Sept. 24, 1935. C. L. HARVEY ET AL 2,015,596
METHOD OF MAKING NUT BLANKS
Filed June 22, 1933   2 Sheets-Sheet 2
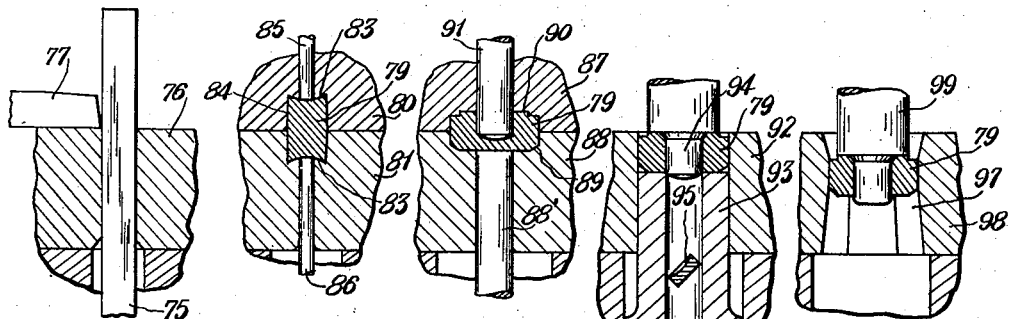
FIG.12   FIG.13   FIG.14   FIG.15   FIG.16
 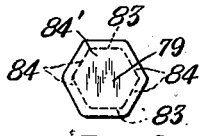 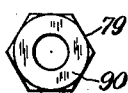 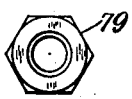 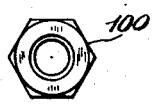
FIG.17   FIG.19   FIG.21   FIG.23   FIG.25
 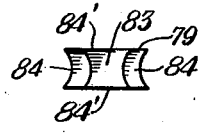 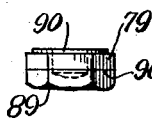  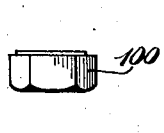
FIG.18   FIG.20   FIG.22   FIG.24   FIG.26
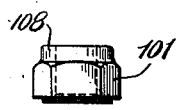 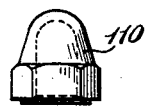 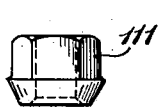 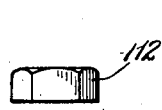
FIG.27   FIG.28   FIG.29   FIG.30
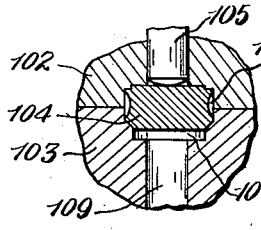 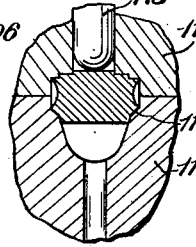 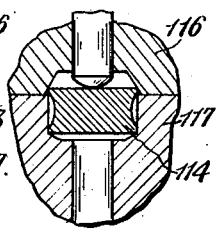 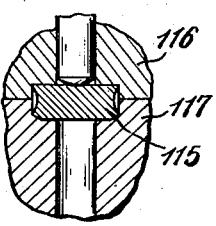
FIG.31   FIG.32   FIG.33   FIG.34
INVENTORS:
CARL L. HARVEY
LEE A. FRAYER
ATTORNEYS Patented Sept. 24, 1935

2,015,596

UNITED STATES PATENT OFFICE 2,015,596

METHOD OF MAKING NUT BLANKS

Carl L. Harvey and Lee A. Frayer, Kent, Ohio, assignors to Roy H. Smith, Kent, Ohio Application June 22, 1933, Serial No. 677,098

20 Claims. (Cl. 10—86)

This invention relates to the production of nut blanks and the like and, more particularly, to a novel method for economically producing articles of this kind which are of superior quality.

An object of our invention is to provide a novel method for the production of nut blanks, wherein a large percentage of the metal from the tap opening is displaced into the article itself to thereby reduce the amount of scrap to a minimum, and wherein this result is attained with a minimum shearing of the metal, and without excessive pressures and the objectionable die friction and wear consequent thereto.

Another object of our invention is to provide a novel method for the production of nut blanks and the like wherein a length of stock is formed in shape so that an intermediate portion of the blank has a cross-section which is smaller than a cross-section at one of the ends of the blank, and wherein such smaller intermediate portion is subsequently expanded to a desired substantially uniform cross-section by forming a tap opening in the blank and thereby displacing metal into the sides of the blank.

More specifically, our invention aims to provide a novel method for the production of nut blanks, which involves forming a length of stock in shape so that a cross-section through a portion intermediate the ends of the blank is smaller than a cross-section at one of said ends and displacing metal from the central portion of the blank by forming a depression in one or both of the ends, and then expanding the portion of smaller cross-section by displacing metal from the tap opening into said intermediate portion.

Still another object of our invention is to provide a novel method of making nut blanks which have faces disposed in polygonal arrangement, wherein we apply pressure to opposite ends of a length of stock having a cross-sectional shape corresponding substantially with the shape of one of said faces, and thereby distribute the metal of said length of stock in a die cavity with the ends of said length of stock forming two substantially oppositely disposed faces of the blank.

A further object of our invention is to provide a novel method for the production of nut blanks, wherein a blank of reduced cross-section intermediate its ends is formed by distributing metal in a die cavity by applying endwise pressure to a length of stock, and then further forming the blank in a die by displacing metal from the center of the blank to form a tap opening therein.

The invention may be further briefly summarized as consisting in certain novel operations or steps of procedure, hereinafter described and particularly set out in the appended claims.

In the accompanying sheets of drawings,

Fig. 1 is a sectional elevation illustrating the step of cutting a desired length from a bar of stock;

Fig. 2 is a sectional elevation illustrating one method of initially forming the blank;

Figs. 3 and 4 are sectional elevations illustrating a further forming operation to which the nut blank is subejcted;

Fig. 5 is a plan view showing a pair of die members which may be used in carrying out the initial forming operation illustrated in Fig. 2;

Fig. 6 is an end elevation of a length of stock from which a nut blank is to be formed;

Fig. 7 is an end view of the partially constructed nut blank after the initial forming operation has been performed thereon;

Figs. 8 and 9 are end and side elevational views, respectively, showing the nut blank at an intermediate stage during the second forming operation;

Figs. 10 and 11 are end and side elevational views, respectively, showing the completed nut blank;

Fig. 12 is a sectional elevation illustrating the step of cutting a desired length of stock for use in carrying out our method in a somewhat different manner;

Fig. 13 is a sectional elevation illustrating the initial forming operation of this method;

Fig. 14 is a sectional elevation illustrating a further forming of the blank wherein metal is displaced into the blank from the tap opening;

Fig. 15 is a similar sectional elevation illustrating the completing of the tap opening;

Fig. 16 is a sectional view illustrating means for removing the flash or otherwise finishing the exterior of the blank;

Figs. 17 and 18 are end and side elevational views, respectively, of the length of stock from which a nut blank is to be formed;

Figs. 19 and 20 are end and side elevational views, respectively, of the nut blank after the initial forming operation illustrated in Fig. 13;

Figs. 21 and 22 are similar views showing the nut blank after the further forming operation illustrated in Fig. 14;

Figs. 23 and 24 are end and side elevational views, respectively, showing the nut blank after the tap opening has been extended therethrough;

Figs. 25 and 26 are end and side elevational views, respectively showing the completed nut blank as produced by this modified method;

Figs. 27 to 30 inclusive are side elevational views showing special forms of nuts which may be produced by our method; and Figs. 31 to 34 inclusive are sectional views illustrating means employed in the production of these special forms of nuts by our method.

Detailed reference will presently be made to the accompanying drawings illustrating the manner of applying our novel method to the production of nut blanks, but before proceeding with such detailed description it should be understood that the invention may be carried out with various kinds of apparatus and that the invention is not necessarily limited to the production of nut blanks but may be utilized as well in economically manufacturing similar articles.

In general, our novel method of producing nut blanks involves applying pressure to a length of stock, which preferably contains substantially the correct amount of metal required for a desired nut blank, and thereby causing the metal of the blank to be so distributed that by a further operation the blank can be formed to the desired shape and the tap opening formed therein with only a minimum amount of metal being discarded as scrap.

More specifically, our novel method involves shaping a length of stock by pressure applied thereto so that an intermediate portion of the blank has a cross-section which is smaller than the cross-section at one of its ends, and displacing metal from the central portion of the blank by forming depressions in the ends thereof. Our novel method involves, further, completing the nut blank which has been thus produced, by displacing metal from the tap opening and expanding the intermediate portion of smaller cross-section whereby a desired nut shape of substantially uniform cross-section is produced. As will be explained more fully hereinafter, the forming of the blank to provide the same with an intermediate section of smaller size, permits the nut blank to be accurately shaped during the subsequent forming operation, by displacement of metal from the tap opening into the article itself and with only a minimum amount of flash being formed on the surface of the nut blank. The formation of the depressions in the ends of the bar of stock, during the initial forming operation, displaces a large percentage of the metal of the tap opening into the article itself in such a manner that the expanding and completing of the tap opening, during the subsequent forming operation, can be accomplished by shearing out only a very small quantity of scrap.

In the drawings, we have illustrated, somewhat diagrammatically, apparatus which may be employed in carrying out our novel method, but it should be understood, however, that any suitable apparatus or machinery may be employed in carrying out this method. In Fig. 1, we have shown a bar 35, of suitable stock, as being extended upwardly through the opening of a block or guide 36, and a length 37 being cut from the bar by a suitable shearing tool 38 to thereby provide substantially the correct amount of metal required for the desired nut blank. In this instance, we have shown the bar stock as being of hexagon cross-sectional shape and, while this particular shape may be desirable when hexagon nut blanks are to be produced, it should be understood, however, that bar stock of round or other cross-sectional shapes may also be used in carrying out our method.

In Fig. 2 of the drawings, we have illustrated the initial forming operation during which the length of stock 37 is subjected to pressure between the cooperating die members 39 and 40 and between the cooperating punch members 41 and 42 to distribute the metal in such a manner that the nut blank 43 thus formed may be completed with only a minimum amount of scrap being produced. As shown in Figs. 2 and 5 of the drawings, the die members 39 and 40 have complemental recesses which provide a die cavity when the die members are held against each other. The cooperating punch members 41 and 42 are of substantially the same cross-sectional shape as the die recess and are arranged to enter this recess from opposite sides of the die members, as shown in Fig. 2. Convex portions 44 are provided on the die members to extend into the die recess, and when the length of stock is subjected to pressure between the die members, these convex projections confine the intermediate portion of the blank while one or both ends of the blank are flared or spread out by the punch members acting thereon. One or both of the punch members 41 and 42 may be provided at their inner ends with tapered projections 46 which form depressions 47 in the ends of the blank by piercing the same and displacing metal from the central portion of the blank into the side walls thereof when the punch members are moved toward each other in the die cavity.

Suitable actuating mechanism may be provided for moving the die members 39 and 40 toward each other to form the die recess and for subsequently separating these members to permit removal of the partially completed nut blank 43. Likewise, suitable means may be provided for actuating the punch members 41 and 42 to operate on the nut blank in the desired manner and in proper timed relation with respect to the actuation of the die members 39 and 40. In carrying out our novel method it will be understood, of course, that suitable means may be employed for advancing the blank from station to station, such as suitably operated feeding fingers. In advancing the section of stock 37 from the shearing operation shown in Fig. 1, to the initial forming operation shown in Fig. 2, it may be desirable to first position this piece of stock immediately below the lower end of the die recess and upon the projection 46 of the lower punch member 41. While the piece of stock is in this position and before the die members 39 and 40 have been moved to the closed position shown in Fig. 5, the punch 41 elevates the piece of stock in the die recess and positions it between the convex projections 44 of the die members. If desired, however, this piece of stock may be transferred to the station for the first forming operation and positioned in the die recess in any other suitable manner. Upward movement of the piece of stock into proper position in the die recess is facilitated to some extent by the fact that the die recess is somewhat larger in cross-section than the hexagon bar 35, and also by reason of the fact that the die members 39 and 40 are partially separated at this time.

While the die members 39 and 40 are tightly held against each other, the punch members 41 and 42 are moved toward each other in the die cavity to press their tapered extensions 46 into the ends of the length of stock and partially form the tap opening by displacing metal from this opening into the article itself, resulting in the partially constructed nut blank shown in Figs. 2 and 7, being produced. With particular reference to the shape of the blank at this stage, it will be noted that concavities 49 have been formed in the intermediate portion of the blank corresponding in contour with the contour of the convex die portions 44. These concavities extend all around the intermediate portion of the blank giving the blank a shape which may be conveniently referred to as an "hour glass" shape.

In Figs. 3 and 4 of the drawings, we have shown means for carrying out the subsequent forming operation wherein the partially constructed nut blank, produced by the forming operation shown in Fig. 2, is accurately shaped and sized and the tap opening is completed. Any suitable means may be employed for this purpose, although in this instance we show a pair of relatively movable platens or blocks 50 and 51 which are provided, respectively, with cooperating die members 52 and 53. These die members are so constructed as to provide a die recess having a shape corresponding substantially with the desired shape of the finished nut blank. In this instance, the die member 52 is shown as having an annular recess 54 therein for forming the integral washer 56 on the finished nut blank, and the die member 53 may have an annular tapered portion 57 for forming a chamfer 57' on the finished nut blank. The die member 52 is provided with an opening through which a punch 58 may be introduced into the die cavity for a purpose presently to be explained. The die member 53 is provided with an opening to accommodate the hollow punch 59 with the upper end of this punch forming a portion of the bottom of the die recess. The punch 59 is arranged for movement in the opening of the die member 53 so that after this forming operation has been completed, the nut blank may be ejected from the die recess by upward movement of this punch member.

The punch 58 is provided adjacent the lower end thereof with a cylindrical portion 60, of a diameter corresponding substantially with the diameter desired for the tap opening in the finished blank, and with a tapered portion 61 at its extreme end which performs a shearing and expanding function. In carrying out the subsequent forming operation, the partially constructed nut blank produced by the initial forming operation is placed in the die recess and, as the cooperating die members 52 and 53 are brought toward each other, the punch 58 descends into the die cavity. The movement of the punch 58 is preferably so timed with respect to the relative movement between the die members 52 and 53, that the lower end of the tapered portion 61 of the punch, shears out the slug or body of metal 62 just prior to the closing of the die members. In Fig. 3 of the drawings, the second forming operation is illustrated at this stage of the method, showing the die members 52 and 53 still slightly separated and the extreme lower end of the tapered portion 61 of the punch as just having sheared out the slug 62. In Figs. 8 and 9 we show the partially completed nut blank, designated 62', just after the slug 62 has been sheared therefrom and before the expanding of the intermediate portion has taken place.

Continued closing movement of the die members subjects the blank to pressure tending to cause metal to flow into the chamfer recess 57 and into the washer forming recess 54, and continued downward movement of the tapered portion 61 of the punch expands the intermediate section of the blank by displacing metal outwardly from the tap opening into the sides of the article. This tapered portion of the punch is so proportioned that downward movement thereof causes a gradual flow of the metal without a tearing or shearing action, with the result that metal from the tap opening is displaced into the article itself and the reduced intermediate section of the blank is expanded to the substantially uniform cross-sectional shape desired in the finished nut blank. It will be understood, of course, that the die members 52 and 53, and the punch 58, need not be actuated to conform exactly with the timed relation just described, but may be actuated in any suitable manner to produce the desired result.

Upon continued downward movement of the punch 58, the cylindrical portion 60 follows the tapered portion 61 through the tap opening of the blank, resulting in this opening being accurately sized to the desired diameter. During this continued downward movement, the annular shoulder 63 formed at the junction of the cylindrical and tapered portions 60 and 61, cooperates with the upper end of the hollow punch 59 in performing a shearing function to remove the excess metal remaining after the expanding or displacing function performed by the tapered portion 61. This excess of metal, which is thus carried downwardly out of the tap opening by the shoulder 63 and sheared from the blank, is usually in the form of a ring-like or sleeve-like slug 64. The slug 62, and the ring or sleeve 64, may be conveniently discharged from the apparatus by allowing the same to drop by gravity through the opening 65 of the hollow punch 59.

In Figs. 10 and 11, we have shown the nut blank, now designated 66, just after the expanding of the intermediate portion and after the shearing out of the ring 64. The nut blank is then substantially complete and may or may not have the chamfer 57' and the washer portion 56, depending upon whether or not the die cavity, formed by the members 52 and 53, is provided with the portions 54 and 57.

From our novel method as thus described, it will be seen that the initial forming operation distributes the metal in such a manner that very little scrap need be sheared from the tap opening of the blank. In providing the blank with an intermediate section of smaller size, very little flash will be produced, during the subsequent forming operation, by the metal being squeezed out between the cooperating die members 52 and 53. Moreover, the "hour-glass" shape of the blank insures that none of the metal of the blank will be trapped between the die members 52 and 53 as they are being closed. Such small amount of flash as may be produced during this subsequent forming operation, due to the lack of absolute rigidity in the die assembly or its parts, may be removed in any suitable manner, as by passing the nut blanks through a suitable trimming and burnishing die, resulting in a finished nut blank as shown in Figs. 10 and 11, which blank is of accurate shape and superior quality.

We find that in the nut blanks produced by our novel method, the grain of the metal extends substantially in the direction of the axis of the tap opening and is such that the nut blanks are of great strength and superior quality. This desired grain arrangement is attained by reason of the fact that the grain, normally extending in the direction of the longitudinal axis of the bar of stock 35 from which the lengths are cut, is not greatly changed during the forming operations of our method. In the initial forming operation, these original grain lines are disturbed in the body of the nut blank only to the extent of being deflected outwardly from the axis of the tap opening by the upsetting or flaring action which results in one or both ends of the blank having a larger cross-section than the intermediate portion of the blank. The only portion of the metal of the original piece of stock which is worked to the extent of crushing or greatly altering the original grain structure, is the small body of metal lying between the depressions formed in the ends of the piece of stock, which small amount of metal is subsequently removed in the form of the slug 62. In the subsequent forming operation, shown in Figs. 3 and 4, the grain lines which have already been deflected or swayed outwardly from the axis at the ends of the nut blank, are now swayed outwardly intermediate the ends of the blank by the expanding of the intermediate section in completing the tap opening. The grain lines are thereby straightened into substantial parallelism with the axis of the nut blank, or, in other words, are restored to the direction they had originally in the bar stock 35. In these forming operations the working of the metal, contained in the body of the blank, improves the quality and structure of the metal so that a finished nut blank of superior strength is produced.

Although we prefer to carry out our method in the manner disclosed in connection with Figs 1 to 5 inclusive, the method may be carried out in the manner illustrated in Figs. 12 to 16 inclusive of the drawings. In Fig. 12 we have shown commercially available bar stock 75 of suitable cross-sectional shape, being fed upwardly through a block or guide 76, preferably by a step by step movement. A suitable shearing tool 77 is arranged for movement laterally across the face of the block for cutting from the bar stock a predetermined length 78, as shown in Figs. 17 and 18, which length contains substantially the correct amount of metal required for a desired nut blank.

In Fig. 13 of the drawings, we have shown the length 78 being subjected to the first forming operation. This operation results in a partially formed nut blank 79, which is shown in Figs. 19 and 20, and which has a shape corresponding roughly with the shape desired in the finished nut blank, in this instance the desired shape of the finished nut blank being hexagonal as shown in Figs. 25 and 26. According to our novel method, the nut blank 79 is formed in the cavity of the cooperating die members 80 and 81 by subjecting the length of stock 78 to endwise pressure, which causes the metal of this bar to be upset or laterally distributed within the die cavity. When distributing the metal of the bar in this manner by pressure applied to opposite ends thereof, it will be seen that the end faces 82 of the bar form the two diametrically disposed faces 83 of the nut blank, and that each one of two opposite side faces of the bar forms a pair of faces 84 on the nut blank and the other two sides of the bar form the end faces 84' of the blank. In this connection, we wish to point out that it is not necessary to the success of our method that the diametrically disposed faces 83 of the nut blank 79 conform exactly in shape with the end faces 82 of the bar 78 but that, in the practical operation of our method, the faces 83 resulting from the initial forming operation usually conform in shape substantially with the shape of the faces 82 of the bar 78. In the drawings, it will be seen that we have represented the bar 78 as being of rectangular cross-sectional shape and that the faces 83 of the nut blank 79 are likewise in the form of a quadrilateral, although not necessarily of the exact shape of the rectangular end face 82. Although bar stock of rectangular cross-sectional shape is preferable for the production of nut blanks having hexagonally disposed faces, we do not wish our method to be limited to the use of this particular shape of stock since, in some instances, it may be desirable to use bar stock which is of square, circular, or other cross-sectional shape.

In Figs. 19 and 20 we have shown the nut blank 79, resulting from the first forming operation, as with the faces 83 and 84 thereof depressed or concave. The formation of such concavities in the faces 83 and 84 of the nut blank during the first forming operation, constitutes an important feature of our novel method because the presence of these concavities results in only a very small amount of flash being formed between the cooperating die members employed in a second forming operation to which the blank is subjected. These concavities also serve to provide space to accommodate metal displaced in the formation of the tap opening in the blank, during the second forming operation, thus permitting a large portion of the metal from the tap opening to be displaced into the body of the nut, which metal would otherwise need to be displaced from the tap opening by a shearing operation.

If desired, the cooperating die members 80 and 81 may be provided, respectively, with knock-out members 85 and 86 for ejecting the partially formed nut blank 79 should the latter stick in either of the die members.

In Fig. 14 of the drawings, we have illustrated the step of subjecting the partially formed nut blank 79 to the second or subsequent forming operation in a cavity provided by the cooperating die members 87 and 88. The cavity of these die members is so formed that when the metal of the nut blank is subjected to pressure therein, the blank will be accurately shaped to substantially the form desired in the finished nut blank. To this end the cavity of these die members is formed with a suitable arrangement of surfaces or faces to provide the nut blank with the chamfer 89 and the elevated washer or bearing face 90, as illustrated in Figs. 21 and 22, as well as such other surface characteristics as may be desirable.

In subjecting the metal of the nut blank to the necessary pressure for accurately shaping the blank to the form shown in Figs. 21 and 22, we employ a non-cutting punch 91 which extends into the die cavity through the die member 87. In carrying out this step of our method the punch 91 is pressed into the nut blank, by suitable means, while the die members 87 and 88 are tightly held together. This movement of the punch displaces metal from the center of the nut blank thereby forming a tap opening by displacing the metal, or a relatively large percentage thereof, from this opening into the body of the nut blank. This displacement of metal from the center of the blank, subjects the blank to the required pressure for accurately shaping the same in the die cavity. During this operation, the displacement of metal from the center of the nut blank by the punch 91, results in the intermediate portion of the blank being expanded by causing the concavities in the side faces to be filled with metal. A further advantage, as explained above, results from the forming of these concavities in the sides of the blank during the first shaping operation, in that such concavities tend to lessen the amount of flash metal which flows, or is displaced laterally, between the meeting faces of the die members 87 and 88 during the second forming operation. In other words, when the nut blanks produced in the first forming operation have concave sides, the nut blanks resulting from the forming operation illustrated in Fig. 14, will have an almost negligible amount of flash. If desired the nut blank may be ejected from the die member 88 by providing the latter with the knock-out 88'.

In carrying out the second forming operation, wherein the nut blank is accurately shaped and metal is displaced from the center of the blank by a punch, as illustrated in Fig. 14, the tap opening thus formed usually extends only part way through the blank, as illustrated in Fig. 22, and is subsequently sheared through the nut blank by the punching operation illustrated in Fig. 15. In this operation the nut blank 79 is supported in a die recess formed by the members 92 and 93 and the tap opening is completed by the action of the punch 94 in shearing a slug of metal 95 from the nut blank. If desired, the nut blank may be ejected from the recess after the shearing operation by arranging the member 93 for movement upwardly relative to the member 92. In Figs. 23 and 24, we have shown the nut blank after the tap opening has been completed by this shearing operation, and in Figs. 22 and 24 we have represented at 96 the slight amount of flash usually present on the exterior of the nut blank at this stage of the method.

For removing the flash, 96, and for accurately sizing and otherwise finishing the faces of the nut blank, we prefer to subject the blank to a finishing operation, such as that illustrated in Fig. 16, wherein the nut blank 79 is forced downwardly through the tapered opening 97 of the die member 98, as by means of the movable punch 99. This finishing operation results in a smoothly finished nut blank 100, as shown in Figs. 25 and 26. The finished nut blanks delivered from the opening of the member 98 may then be collected, and arranged for tapping and other subsequent operations.

In Figs. 27 to 30, inclusive, we have shown various special forms of nut blanks which can be economically produced by our novel method, and in Figs. 31 to 34, inclusive, we have shown the manner of carrying out our method in producing these special forms. The nut blank 101 illustrated in Fig. 27 is of the form employed in making castle nuts, and in Fig. 31, we have shown cooperating die members 102 and 103 for applying pressure to the partially constructed nut blank 104 to accurately shape the same. In the subsequent forming operation to which this blank is subjected in the die members 102 and 103, metal is displaced by a non-cutting punch 105 extending through one of the die members. This displacement of metal forms a tap opening in the nut blank and, at the same time, causes the concavities 106 of the nut faces to be filled in with metal and causes metal to be displaced into the recess 107 of the die member 103 for forming the castle portion 108. The nut blank may be ejected from the die member 103 by providing the latter with a suitable knock-out 109.

In a similar manner, the nut blanks 110, 111 and 112, shown respectively in Figs. 28, 29, and 30, may be produced from the partially constructed nut blanks 113, 114, and 115, shown in Figs. 32, 33, and 34, by the use of suitable cooperating die members 116 and 117 and a suitable non-cutting punch 118 extending through the die member 116.

From the foregoing description and the accompanying drawings it should now be readily understood that we have provided a novel and efficient method by which nut blanks and like articles can be economically manufactured with a minimum amount of scrap being produced and by the use of relatively simple apparatus. It will be seen, moreover, that in forming nut blanks and the like by the use of pressure applied in the manner provided in our novel method, a distribution of metal is attained such that the grain lines of the metal are admirably disposed to produce an article of high tensile strength.

While we have illustrated and described our novel method in a detailed manner, it should be understood, however, that we do not wish to be limited to the precise operations and steps of procedure herein described, but regard our invention as including such changes and modifications as do not involve a departure from the spirit of the invention and the scope of the appended claims.

Having thus described our invention, we claim:

1. The method of making nut blanks which comprises cutting a bar of stock to length to provide approximately the correct amount of metal required for a desired nut blank, shaping said length in a die by piercing the ends of the length and thereby expanding said ends while an intermediate portion of said length is confined, and then expanding the reduced portion to provide the blank with a substantially uniform cross-section.

2. The method of making nut blanks which comprises forming a section of stock into a blank of substantially hour-glass shape having depressions in the opposite ends thereof by piercing the ends of the stock to expand the same while an intermediate portion of the stock is confined, removing excess metal from between said depressions, and expanding the intermediate portion to provide the blank with a desired substantially uniform cross-section.

3. The method of making nut blanks which comprises enlarging the end portions of a length of stock while an intermediate portion thereof is confined, and forming a tap opening in the blank by displacing metal from that portion of the blank in which said opening is to be formed into the sides of the blank and expanding said intermediate portion.

4. The method of making nut blanks which comprises enlarging the end portions of a length of stock while an intermediate portion thereof is confined, and at the same time forming a substantially central opening in at least one end of the blank, and then expanding said intermediate portion.

5. The method of making nut blanks which comprises enlarging the end portions of a length of stock while an intermediate portion thereof is confined and at the same time forming a substantially central tapered opening in at least one end of the blank, and then expanding said intermediate portion by enlarging said opening.

6. The method of making nut blanks which comprises applying pressure to a body of metal in a die to provide the body with a reduced cross-section intermediate its ends and to displace metal from the central portion of said body into the sides thereof by forming recesses in the opposite ends of the body, and then shaping said body into a nut blank by pressure applied thereto in a die, such pressure shaping being accomplished by first shearing excess metal from between said recesses and then enlarging said recesses and expanding the reduced intermediate section by displacing additional metal into the sides of the body.

7. The method of making nut blanks which comprises applying pressure to a body of metal in a die to provide the body with a reduced cross-section intermediate its ends and to displace metal from the central portion of said body into the sides thereof by forming recesses in the opposite ends of the body, and then shaping said body into a nut blank by pressure applied thereto in a die, such pressure shaping being accomplished by first removing excess metal from between said recesses to connect the same, then enlarging said recesses and expanding the reduced intermediate section by displacing additional metal into the sides of said body, and then sizing the tap opening formed by the connected recesses.

8. The method of making nut blanks which comprises applying pressure to the ends of a length of polygonal stock and in the direction of its length and thereby deforming said stock so that the ends of said length form two diametrically opposed side faces of the nut blank and two of the sides of said length form the other side faces of the nut blank.

9. In a method of making nut blanks having faces disposed in polygonal arrangement the step of upsetting a section of bar stock having a cross-sectional shape corresponding substantially with the shape of said faces by applying pressure to the ends of said sections and in the direction of its length whereby the ends of said section form two of the faces of the nut blank.

10. The method of making nut blanks having faces disposed in polygonal arrangement which comprises shaping in a die cavity having substantially the shape of a desired nut blank a length of bar stock of a cross-sectional shape corresponding with the shape of said faces by applying pressure to the ends of the stock and in the direction of its length and thereby distributing the metal in the die cavity and forming a nut blank having an end of the length of stock as one of said polygonal faces.

11. In a method of making nut blanks the steps of expanding end portions of a section of stock while an intermediate portion thereof is confined, and subsequently expanding said intermediate portion.

12. In a method of making nut blanks the steps of piercing the ends of a section of stock and thereby expanding the same while an intermediate portion of the stock is confined, and subsequently forming a tap opening through the blank and in the same operation expanding said intermediate portion.

13. In a method of producing nut blanks the steps of forming tapered openings in opposite ends of a body of stock and thereby expanding said ends while an intermediate portion of the body is confined, and subsequently removing metal from between the adjacent ends of said tapered openings and expanding said intermediate portion by changing the tapered openings into a substantially cylindrical tap opening.

14. In a method of making nut blanks, the steps of piercing opposite ends of a metal body and thereby expanding the ends relatively to an intermediate portion, and then expanding said intermediate portion.

15. In a method of making nut blanks, the steps of piercing opposite ends of a metal body and thereby expanding the ends relatively to an intermediate portion, and then expanding said intermediate portion by forming an opening therethrough.

16. The method of making nut blanks which comprises piercing opposite ends of a metal body and thereby expanding the same relatively to an intermediate portion of the blank, and then expanding said intermediate portion and in the same operation shaping the body to substantially the desired nut form.

17. In a method of making nut blanks, the steps of forcing tapered punches into opposite ends of a metal body and thereby expanding the ends relatively to an intermediate portion, and then forcing a tapered punch into the body to expand said intermediate portion.

18. The method of making nut blanks which comprises forcing tapered punches into opposite ends of a metal body and thereby expanding the ends relatively to an intermediate portion, and then forcing the tapered punch into the body to expand said intermediate portion and in the same operation shaping the body to substantially the desired nut form.

19. In a method of making nut blanks the steps of forcing a tapered punch part-way into an end of a metal body and thereby expanding such end relatively to an intermediate portion of the body, and then forcing a tapered punch into said body from said expanded end and thereby expanding the smaller portion of the body.

20. The method of making nut blanks which comprises forcing a tapered punch part-way into an end of a metal body and thereby expanding such end relatively to an intermediate portion of the body, and then forcing a tapered punch into said body from said expanded end to thereby expand the smaller portions of the body and in the same operation shaping the body to substantially the desired nut form.

CARL L. HARVEY.
LEE A. FRAYER.